Figure 1:
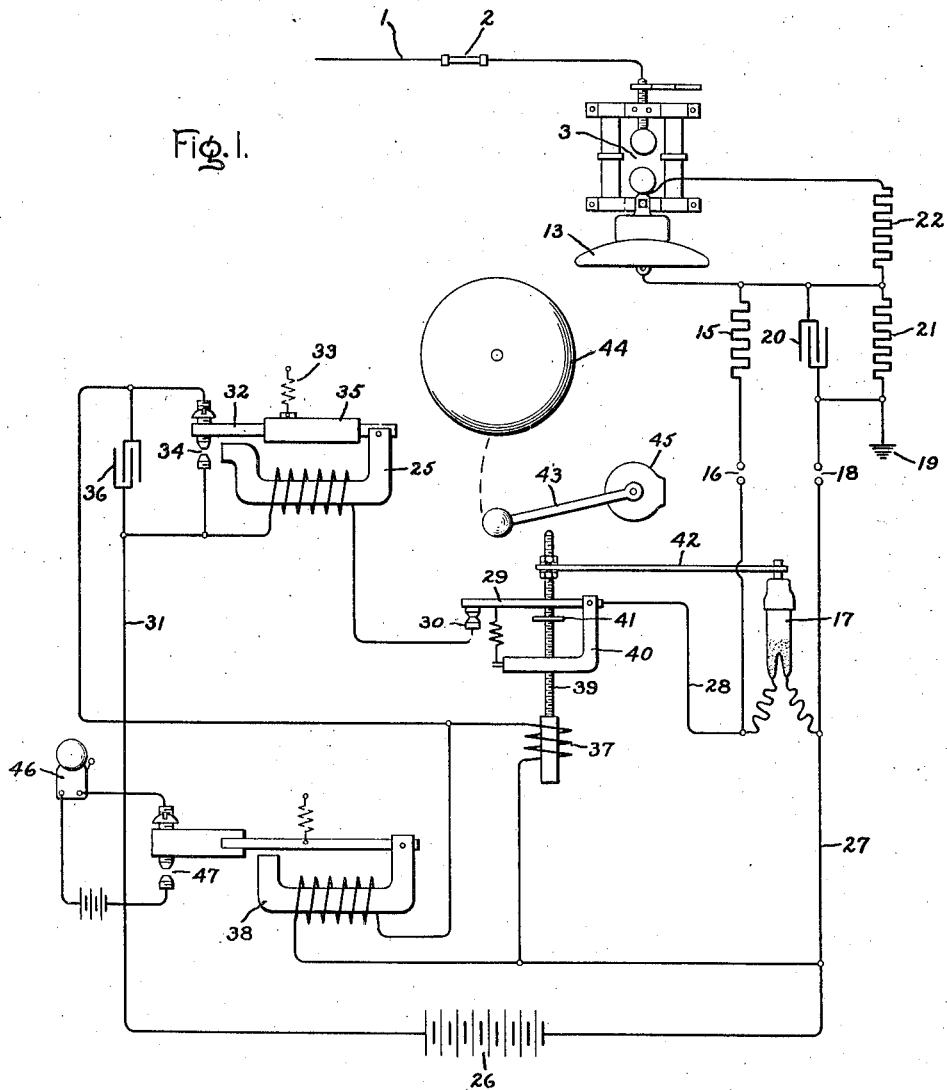

Aug. 11, 1925.

E. E. F. CREIGHTON 1,549,456

ELECTRIC DISCHARGE INDICATOR

Filed Feb. 11, 1922      2 Sheets-Sheet 1

Inventor:
Elmer E. F. Creighton,
by Albert G. Davis
His Attorney.

Aug. 11, 1925.

E. E. F. CREIGHTON 1,549,456

ELECTRIC DISCHARGE INDICATOR

Filed Feb. 11, 1922   2 Sheets-Sheet 2

Inventor:
Elmer E. F. Creighton,
by Albert G. Davis
His Attorney.

Patented Aug. 11, 1925.

1,549,456

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

ELECTRIC DISCHARGE INDICATOR.

Application filed February 11, 1922. Serial No. 535,938.

*To all whom it may concern:*

Be it known that I, ELMER E. F. CREIGHTON, a citizen of the United States, residing at Schenectady, in the county of Schenectady, State of New York, have invented certain new and useful Improvements in Electric Discharge Indicators, of which the following is a specification.

My invention relates to apparatus for indicating the occurrence of an electric discharge such as might be caused by a transient condition of an electric circuit. The principal object of my invention is to provide a highly reliable apparatus of the class described which may be adjusted to respond to different minimum voltages and give consistent results irrespective of the magnitude and frequency of the transient. A further object of my invention is to provide an electric discharge indicator which automatically clears itself after each discharge and places itself in readiness for another operation. A further object is the provision of means whereby each indication may be recorded either visually or audibly or by both methods. Other advantageous details of my improved apparatus will be pointed out as the description proceeds.

The features of my invention which I believe to be novel and patentable will be pointed out in the claims appended hereto. The details of construction and the manner of using one form of my invention will now be explained in connection with the accompanying drawings, Fig. 1 of which shows the wiring diagram of my apparatus when used as a transient voltage recorder and Fig. 2 shows an assembly view of the apparatus.

Before describing the invention in detail it will be helpful to mention briefly the main elements of the transient voltage recorder and their relation to each other. The recorder comprises a voltage measuring gap set for the minimum voltage which it is desired to record, a high resistance circuit containing a detection device, and a recording mechanism controlled by the detector. The gap and high resistance circuit containing the detecting device are connected in series across the points between which the transient voltage occurs; for example, between a high tension transmission system and ground. When the voltage across the gap exceeds the break-down point a discharge takes place, a portion at least of which passes through the detecting device and causes the same to set in operation the recording mechanism. The transient phenomena of a transmission line occur at widely different voltages and frequencies and under a variety of conditions. The recorder built in accordance with my invention is designed to give accurate and consistent results under all transient conditions above a given voltage liable to be found in connection with a high voltage transmission system, and to prevent other conditions of lower voltage values from actuating the detector.

Figure 2:
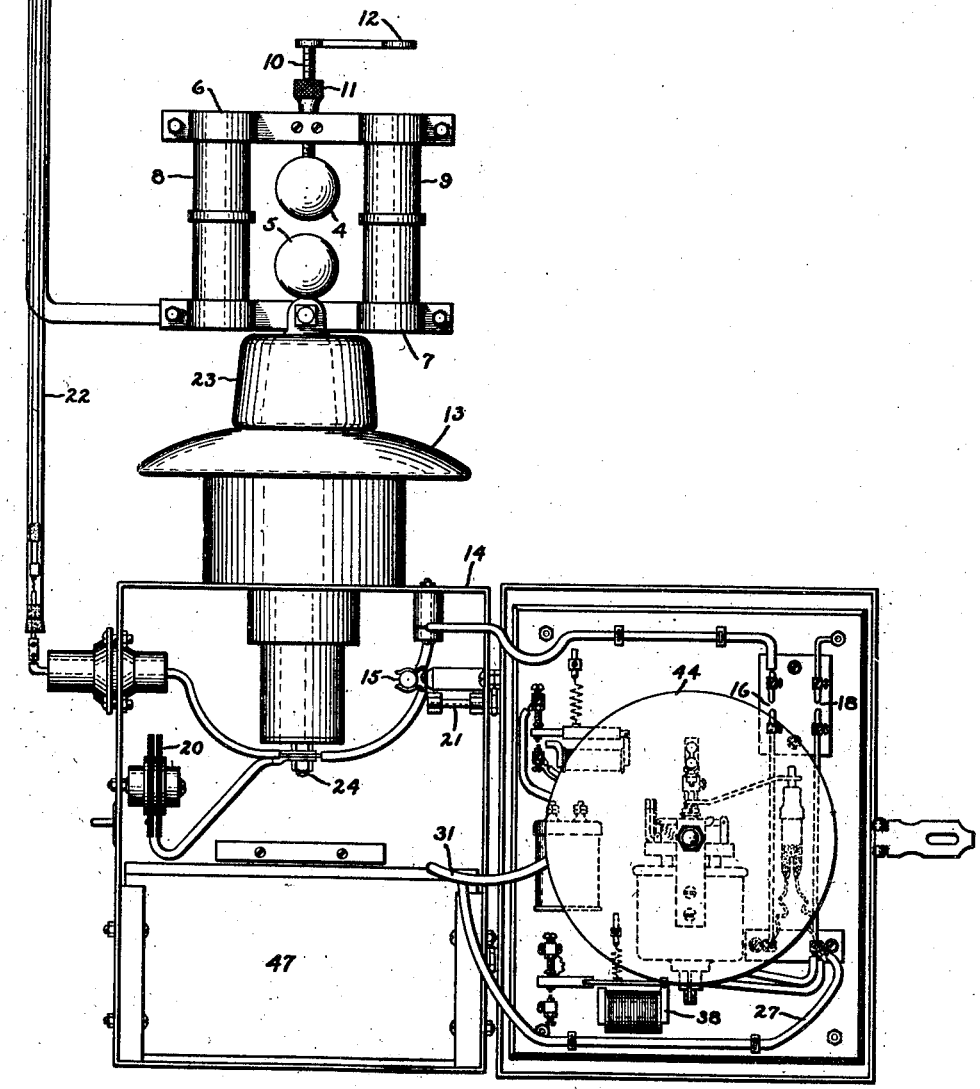

Referring now to Fig. 1, 1 indicates a connection to a high tension transmission system, 2 a high resistance fuse and 3 a spark gap preferably of the sphere type. The sphere gap is best shown in Fig. 2, and comprises the two spheres 4 and 5 held in spaced relation in a suitable frame work comprising the supports 6 and 7 and the insulating members 8 and 9. The length of the gap is adapted to be adjusted for different voltages and to this end the upper sphere is shown mounted on a bolt 10 threaded through the upper support 6 and a locknut 11. A lever arm 12 is secured to the upper end of the bolt for convenience in adjusting. The lower support of the sphere gap comprises a metal cap 23 mounted on an insulator 13 which in turn is suitably supported on a case 14 containing various parts of the apparatus to be referred to. As shown in Fig. 1 the lower end of the insulator 13 is connected through a resistance 15, a small gap 16, a detecting relay 17, preferably a Branly coherer containing metal filing, a small gap 18 to ground at 19. In shunt to the circuit just traced between the lower side of the insulator 13 and ground is a condenser 20 and a resistance 21, the latter two being in parallel. Across the insulator is shunted a high resistance 22. The purpose of these various parts will now be explained.

If the coherer 17 were connected directly between the insulator and ground, omitting the small gaps 16 and 18, a false record of discharge would be obtained on a system operating at normal voltage. The reason for this is because the sphere gap 3 acts as an ordinary electrostatic condenser and without any spark discharge passing across the sphere gap a sufficient quantity of electricity would pass through the coherer 17 to cause coherence of its particles. This is prevented by the gap 16. The gap 18 prevents a false record due to lightning discharges and local impulses rising from the ground connection which are not sufficient to break down the sphere gap 3. The gaps 16 and 18 are not sufficient however to prevent a discharge through the coherer when a spark discharge occurs across the sphere gap 3. The series resistance 15 is for the purpose of preventing a discharge through the coherer of such magnitude as to interfere with its proper operation. As will be explained more in detail later, the coherer is also included in the circuit of a direct current battery or dry cell which causes a current to flow through relays to operate recording devices whenever the granules are caused to cohere by the passage of a spark. If the discharge through the recorder is not limited by a resistance such as shown at 15, the sparks may be sufficiently heavy to cause an explosive effect tending to move the granules of the coherer apart in such a way as to prevent the passage of the direct current from the battery. It was mentioned above that the sphere gap constitutes a natural condenser. The small gaps 16 and 18 also have a natural capacity of a much smaller value. The electrostatic capacity of the sphere gap as compared to the electrostatic capacity of the gaps of the coherer is so great as to cause considerable voltage to exist across the coherer gaps when the voltage across the sphere gap is just below sparking value. Another way of expressing this condition is that the voltage divides inversely as the capacitance of the gaps. The insulator 13 also has considerable capacity but its capacitance is large as compared to the capacitance of the gaps involved so that it has only a slight effect in reducing the voltage across the coherer gaps due to these conditions. In order to prevent a spark discharge from playing across the coherer gap due to the conditions just mentioned, I provide the condenser 20 in shunt thereto. This capacity is large in proportion to the sphere gap capacity and thus reduces the voltage across the coherer gap to a value below sparking voltage and prevents a false record being made when the voltage across the sphere gap is below the break-down value. The capacity of the condenser 20 is however not sufficiently great to prevent a discharge across the coherer gaps when a spark passes across the sphere gap. The resistance 21 is connected in shunt to the condenser 20 to prevent a false record being made due to the building up of an excessive charge on the condenser 20. When a voltage of a value just below sparking voltage exists across the sphere gap 3 a tiny stream of corona plays from the several sharp corners on the support above the sphere gap and if it were not for the shunt resistance 21, this continual brush discharge, and in fact any other accumulated charge such as might come from the atmosphere, would cause the condenser 20 to become charged to a point where it would discharge through the coherer gaps and cause a false record. The resistance 21 is provided to safely conduct such charges to ground and is made sufficiently high to force a portion at least of a natural discharge of the sphere gap across the coherer gap and through the coherer. A very high resistance 22, preferably of the liquid type as shown in Fig. 2, is provided across the insulator 13 which, as has been stated above, has considerable capacity. The purpose of this resistance 22 may best be explained by referring to the behavior of the apparatus when the resistance is omitted; thus, when a discharge takes place across the sphere gap due to a transient condition, it will leave the insulator 13 in more or less of a charged condition. The voltage of this charge may then either combine or subtract from another impulse or with the normal frequency voltage of the system. If the new voltage is of opposite sign, the voltage across the sphere gap will be increased by the residual voltage on the insulator and vice versa and if it is of the same sign, it will be subtracted, thus giving a false condition for recording accurately the voltages which appear on the line. It may be possible to obtain a false record due to the gradual loss of the residual charge that has been left in the insulator by reason of the fact that a release of the charge on the upper side frees a charge on the lower side of the insulator, and since the gaps across the coherer have low settings, it is comparatively easy to get a charge across these gaps. The reason for producing the trouble in such a case is the loss of corona discharge and not by leakage either through the porcelain insulator or around its surface. The correction of this fault is obtained by the use of the high resistance 22. This resistance is made sturdy enough to withstand continuous discharge and has a value designed to discharge an insulator in a small fraction of a cycle of the normal frequency on the system. Thereby a reversal of this normal frequency wave would always find the insulator free of a residual charge. The insulator itself is preferably made of material which will give a constant capacity and in assembling the insulator the metal cap 23 and the insulator pin 24 (see Fig. 2) are preferably connected to the insulator 13 by conducting cement or by metallic conductors in order that the capacitance of the insulator be maintained at a constant value under all conditions of humidity. The insulator 13 also prevents short circuits when a discharge occurs.

In order that the relative values of the various resistances and capacities may be had I give below the approximate values which I have found to be suitable for a recorder adapted to be used on a 60 cycle 10,000 volt system in which the sphere gap may be set for any value of transient voltage between 10,000 and 50,000, which voltage may have a frequency varying from zero to 5,000,000 cycles per second or above.

Capacity of the condenser 20 100 x $10^{12}$ farads.

Capacity of the insulator 13 75 x $10^{12}$ farads.

Resistance of 22 40–70 meg ohms.
Resistance of 15 1500 ohms.
Resistance of 21 100–250 meg ohms.

The gaps 16 and 18 are adjustable and their setting will be governed to some extent by the setting of the main gap 3; thus, when the main sphere gap is adjusted for 50,000 volts, the separation of the small gaps will be approximately .045 inch, and when the main sphere gap is adjusted for 20,000 volts, the small gap will have a separation of approximately .020 inch.

The metallic granules of the Branly coherer are preferably made of roasted nickel filings. I desire to have it understood that these values are only approximate and the invention is by no means limited thereto.

Having thus explained how I obtain a highly accurate and consistent impulse through the coherer for any transient voltage of sufficient magnitude to pass across the sphere gap, I will now explain the manner in which the discharge may be recorded. The coherer 17 is in the circuit of a relay 25, which may be termed the coherer relay, and a battery 26. This circuit may be traced as follows starting at the battery 26, through line 27, coherer 17, line 28, pivoted switch arm 29, stationary contact 30, the energizing coil of coherer relay 25, line 31, back to the battery 26. When the circuit just traced is closed by coherence of the granules in the coherer 17 the coherer relay 25 is energized and its armature 32 is drawn to its seat against the tension of the spring 33 to close the contacts 34. The coherer relay 25 is made very sensitive and its armature 32 is provided with a short circuited band of conducting material 35 which acts to prolong the duration of closure of the contacts 34. The contacts 34 are preferably shunted by a condenser 36 to prevent sparking. These contacts control the circuit of two other relays 37 and 38 connected across the same battery 26. The circuits for these relays may be easily traced on Fig. 1. The relay 37, hereinafter referred to as the main relay, is a heavy duty relay and its operation performs several functions. Its core is provided with a threaded extension 39 suitably guided and passing through a stationary support 40 and an opening in the switch arm 29. The extension 39 carries an adjustable nut 41 beneath the switch arm 29 and positioned a short distance away therefrom when the relay is deenergized as illustrated. The extension 39 is also rigidly connected to the coherer tube 17 by an arm 42. Just above the end of the extension 39 when in the deenergized position and in its path of movement in the energized position, is the arm 43 of a gong 44. The pivoted end of this arm is fastened to the shaft of a counting device 45. It will now be apparent that when the main relay is energized it performs the following operations; the core and extension 39, nut 41, arm 42, and coherer tube 17 are carried upward with a quick movement, the nut 41 strikes the switch arm 29 and breaks the circuit of the coherer relay at 30, the coherer tube is given a vigorous shake throwing the granules into the upper part of the tube decoherizing them and at the same time acting as a circuit breaker for any current which may persist in either the direct current or alternating current circuits passing therethrough, and the upper end of the extension 39 strikes gong arm 43 carrying it upward, ringing the gong 44 and at the same time notching up a number on the counter 45. The parts immediately return to the deenergized position because the circuit of the coherer relay 25 is now broken by reason of the decoherence of the coherer, which allows the spring 33 to separate the contacts 34 and open the circuit of the main relay 37. Simultaneously with the energizing of the main relay 37 the auxiliary relay 38 is energized. This relay merely closes the circuit of one or more signaling devices 46 which may be located at any distant point or ponits. It will be noticed that the contacts 47 of the auxiliary relay 38 are heavily insulated from the remaining parts of the relay which is a precaution against stray impulses being conveyed to the coherer from an outside source such as might cause an operation of the coherer to produce a false record.

As shown in Fig. 2, the greater part of the apparatus is contained in the case 14, the coherer, the coherer gaps, the three relays and the gong being mounted on the inside of the cover which is shown in the open position. The counter 45 is preferably mounted on the cover in a position to be read from the outside of the box through a small opening when the door is closed. The storage battery or dry cell 26 is enclosed in a suitable container 47 located in the bottom of the case. One side of the condenser 20, the resistance 21 and the gap 18 are grounded on the case which is made of iron and is, of course, permanently connected to ground. The liquid resistance 22 which may consist of grain alcohol is contained in a suitable tube shown in Fig. 2 supported between the lower support 7 of the sphere gap and a bushing through the casing 14, and it is electrically connected between the support 7 and the insulator pin 24. Aside from the convenience incidental to mounting the various parts of the apparatus in a containing case as illustrated, the case being made of iron, also serves the purpose of protecting the coherer and relay from induction, wireless impulses and impulses rising from the ground, such as might cause a total or partial coherence of the Branly coherer. While such impulses might not cause a false record, they would tend to reduce the resistance through the coherer to such a value as to deteriorate the battery 26. The iron casing which totally encloses these parts protects them against such impulses in a well understood manner. The coil of relay 25 is preferably made of a high resistance so that a complete coherence of the granules in the coherer is necessary before sufficient direct current will flow through its circuit to cause its operation. This high resistance circuit also tends to reduce the battery current which would otherwise flow through the circuit due to a partial coherence caused by stray impulses when the door of the casing is left open.

The operation of the complete apparatus may be briefly summarized as follows: The upper sphere is directly connected to a transmission line or other circuit, the abnormal voltage conditions of which it is desired to record. The sphere gap is set to the desired value of spark over-voltage above the normal voltage of the line. If the line has a normal voltage of 25,000 volts, the sphere gap may be set to pass a discharge, say, when the voltage to ground exceeds a value of 30,000. The parts will normally stand in a position shown in Fig. 1, and the door of the casing should preferably be closed. When a voltage of any value above 30,000 occurs between the line and ground, say, 35,000, a spark discharge will occur across the sphere gap and a portion will pass through the circuit of the coherer across the gaps 16 and 18 to ground thereby causing the granules of the coherer to adhere, thus closing the circuit of the coherer relay 25. The operation of the coherer relay closes the circuits of the main relay 37 and the signal relay 38 at 34. Relay 37 then acts to open the coherer relay circuit at 30, to decohere the coherer tube 17, sound the gong 44 and notch up a number on the counter 45. The signal relay 38 closes the signal circuit at 47 thereby causing the bell or other signaling device 46 to notify an attendant at a distant point of the abnormal voltage condition occurring on the transmission line. The parts immediately return to their normal condition and the apparatus is ready for another operation.

The apparatus is not intended in any way to be a protection to the line. It does not record the maximum voltage present, but makes a record whenever its value is sufficiently high to spark over the main sphere gap. The actual value of this voltage may be determined however, by the use of several recorders with different sphere gap settings. The apparatus may be used to record lightning discharges.

In accordance with the provisions of the patent statutes I have described the principle of operation of my invention together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. An electric discharge recorder comprising a high resistance circuit, a high voltage spark gap in said circuit, two low voltage spark gaps in said circuit and means located in said circuit between said low voltage gaps for establishing an indication whenever a spark passes across said gaps.

2. In combination a line, a high voltage sphere gap, a supporting insulator for said sphere gap serving as a condenser, a low voltage gap, a detector, a second low voltage gap, and a ground connection connected in series relation in the order named, means including said low voltage gaps for permitting the passage of a spark through said detector only when a spark passes across said high voltage gap, and means associated with said detector for indicating the passage of a spark therethrough.

3. An electric discharge recorder comprising a high voltage spark gap, a plurality of low voltage spark gaps, said last mentioned gaps being connected in series with said high voltage gap through an insulator serving as a condenser, means connected in parallel to said low voltage gaps for permitting a discharge therethrough only when a discharge takes place across said high voltage gap and means for indicating the passage of a discharge across said gaps.

4. An electric discharge recorder comprising a high voltage spark gap, a plurality of low voltage spark gaps, said last mentioned gaps being connected in series with said high voltage gap through an insulator serving as a condenser, a low resistance in series with said low voltage gaps, a condenser and a comparatively high resistance connected in parallel with each other and in shunt to said low resistance and low voltage gaps and means for indicating the passage of a spark across said gaps.

5. An electric discharge recorder comprising a high voltage spark gap, a plurality of low voltage spark gaps, said last mentioned gaps being connected in series with said high voltage gap through an insulator serving as a condenser, a low resistance in series with said low voltage gap, a comparatively high resistance connected across said insulator, a condenser and a comparatively higher resistance connected in parallel with each other and in shunt to said low voltage gaps and low resistance and means for indicating the passage of a spark across said gaps.

6. An electric discharge recorder comprising a high voltage adjustable spark gap, two low voltage adjustable spark gaps, said last mentioned gaps being connected in series with said high voltage gap through an insulator serving as a condenser, a resistance connected in shunt to said insulator, a condenser connected in shunt to said low voltage gaps, a resistance connected in shunt to said condenser, said resistances and condenser being of such values as to permit the passage of a spark across said low voltage gaps only when a discharge occurs across said high voltage gap, a coherer between said low voltage gaps, a resistance for limiting the discharge current therethrough and a recording relay circuit controlled by said coherer.

7. In combination an electric line having a normal high voltage with respect to ground, apparatus for recording abnormally higher potentials on said circuit comprising a high resistance circuit between said line and ground said circuit containing a spark gap having a setting higher than the normal line voltage and two low voltage spark gaps, an insulator between said high and low voltage gaps, means connected in shunt to said insulator and means connected in shunt to said low voltage spark gaps for permitting the passage of a spark between said low voltage gaps only when a discharge occurs across said high voltage gap, a coherer between said low voltage gaps and an indicating device controlled by the passage of a spark through said coherer.

8. In combination a high voltage line, apparatus for detecting and recording an abnormally high voltage condition on said line, comprising a circuit between said line and ground containing an insulator and a spark gap which is set above the normal discharge voltage of the line, a coherer contained between low voltage spark gaps in said circuit, a liquid resistance in shunt to said insulator and means in shunt to said low voltage gaps and coherer for permitting a spark to pass through said coherer only when an abnormally high voltage condition causes a discharge across said high voltage gap, an indicating device controlled by said coherer and a grounded metallic casing for externally supporting said high voltage spark gap, insulator and shunting resistance and enclosing the remaining parts of the apparatus.

9. An electrical instrument comprising in combination a spark gap capable of being adjusted for break-down voltages between 10,000 and 50,000 connected in series with an insulator having a capacity in the neighborhood of $75 \times 10^{12}$ farads, a resistance of approximately 1500 ohms, and a pair of spark gaps each capable of being adjusted between .020 and .045 inch separation, a resistance of from 40 to 70 meg ohms in shunt to said insulator, a condenser having a capacity in the neighborhood of $100 \times 10^{12}$ farads in shunt to said series resistance and last mentioned gaps, a resistance of from 100 to 250 meg ohms in shunt to said condenser, and means for detecting the passage of a spark included in the series circuit between said last mentioned gaps.

In witness whereof, I have hereunto set my hand this 10th day February, 1922.

ELMER E. F. CREIGHTON.